United States Patent
Salhi et al.

(10) Patent No.: US 12,523,503 B2
(45) Date of Patent: Jan. 13, 2026

(54) BRAGG WAVELENGTH SPECTRAL INTERROGATION DEVICE

(71) Applicant: SAFRAN, Paris (FR)

(72) Inventors: Nassim Salhi, Moissy-Cramayel (FR); Minh Chau Phan Huy, Moissy-Cramayel (FR)

(73) Assignee: SAFRAN, Paris (FR)

( * ) Notice: Subject to any disclaimer, the term of this patent is extended or adjusted under 35 U.S.C. 154(b) by 268 days.

(21) Appl. No.: 18/562,582

(22) PCT Filed: May 18, 2022

(86) PCT No.: PCT/FR2022/050948
§ 371 (c)(1),
(2) Date: Nov. 20, 2023

(87) PCT Pub. No.: WO2022/243639
PCT Pub. Date: Nov. 24, 2022

(65) Prior Publication Data
US 2024/0240973 A1    Jul. 18, 2024

(30) Foreign Application Priority Data

May 21, 2021    (FR) ...................................... 2105356

(51) Int. Cl.
*G01D 5/353*    (2006.01)
(52) U.S. Cl.
CPC ..... *G01D 5/35367* (2013.01); *G01D 5/35387* (2013.01)
(58) Field of Classification Search
CPC ........... G01D 5/35367; G01D 5/35387; G01D 5/3539; G01D 5/35316
See application file for complete search history.

(56) References Cited

U.S. PATENT DOCUMENTS

| | | | |
|---|---|---|---|
| 9,062,965 B2 * | 6/2015 | Yoshida | G01B 11/165 |
| 9,909,951 B2 * | 3/2018 | Jaaskelainen | G01M 11/31 |
| 2007/0024857 A1 | 2/2007 | Menezo | |

FOREIGN PATENT DOCUMENTS

| | | |
|---|---|---|
| CN | 101765031 A | 6/2010 |
| CN | 102879025 A | 1/2013 |
| JP | 201531594 A | 2/2015 |

OTHER PUBLICATIONS

Dakin J.. P et al: "Distributed and Multiplexed Fibre Grating Sensors, Including Discussion of Problem Areas", IEICE Trans. Electron, vol. E83-C, No. 3, Mar. 2000 (Mar. 2000), pp. 391-399.

(Continued)

*Primary Examiner* — John Bedtelyon
(74) *Attorney, Agent, or Firm* — McDonald Hopkins LLC (57) ABSTRACT

A spectral interrogation device, including: an optical source for emitting a light signal, a measurement optical fibre comprising a series of successive Bragg gratings for reflecting the light signal in different wavelength bands, a reflective optical fibre comprising a total reflection element, a wavelength detector, and an optical switch for switching between a sequence of three operating modes. In a first mode, the light signal emitted by a given optical source is guided from the optical source to a corresponding measurement optical fibre. In a second mode, the light signal is guided to make a predetermined number of return trips in a line formed by a coupling between the measurement optical fibre and a corresponding reflective optical fibre, generating a predetermined delay between the successive gratings. In a third mode, the light signal is guided to a corresponding detector to successively measure the wavelength bands associated with the gratings.

12 Claims, 6 Drawing Sheets

(56) References Cited

OTHER PUBLICATIONS

Zhang L et al: "In-Fiber Optic Sensors", Jan. 2002 (Jan. 2002), Jan. 1, 2002, pp. 1-60 , XP002534197, ISBN:978-0-8247-0732-3.
Lloyd G. D. et al: "Resonant Cavity Time-Division-Multiplexed Fiber Bragg Grating Sensor Interrogator", ISEE Photonics Technology Letters, IEEE, USA, vol. 16, No. 10, Oct. 2004 (Oct. 2004), pp. 2323-232.
Written Opinion Issued in PCT/FR2022/050948, dated May 21, 2021.
International Search Report issued in Application No. PCT/FR2022/050948, dated Aug. 23, 2022.
Preliminary Search Report for French application No. FR2105356, dated Jan. 21, 2022.

* cited by examiner

BRAGG WAVELENGTH SPECTRAL INTERROGATION DEVICE

CROSS-REFERENCE TO RELATED APPLICATIONS

This is the National Stage of PCT international application PCT/FR2022/050948, filed on May 18, 2022, which claims the priority of French Patent Application No. 2105356, filed May 21, 2021, both of which are incorporated herein by reference in their entireties.

TECHNICAL FIELD

The present invention relates to the field of measurements (by time domain multiplexing) in fibre optic Bragg gratings and more specially Bragg wavelength spectral interrogators that can be used in fibre optic sensors.

PRIOR ART

In the field of fibre optic sensors, Bragg gratings are very often used to extract spectral information. One measurement extraction technique is time-domain multiplexing (TDM). This technique involves measuring the Bragg peaks from a Bragg grating line one by one. This method involves serial measurement of peaks that are not coincident (each Bragg peak is delayed in time relative to the previous peak).

In the prior art, there are two main TDM-based solutions. A first solution involves temporal separation by spatial distancing of fibre Bragg gratings (FBG).

Figure 5A:
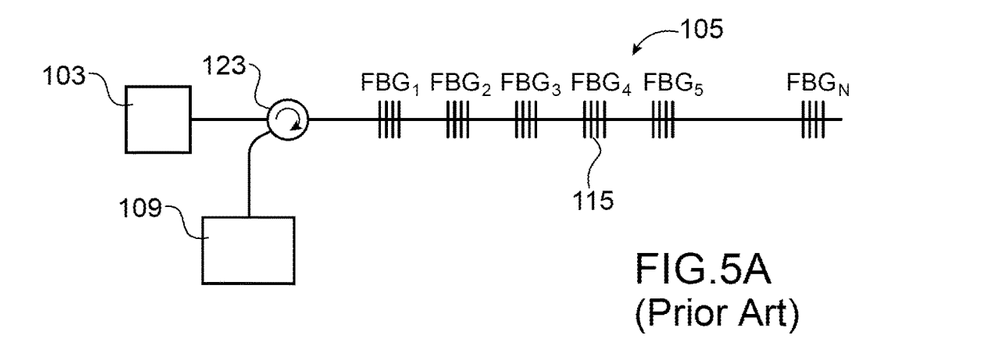
FIG. 5A schematically shows a spectral interrogation device with temporal separation by spatial distancing, according to the prior art.

FIG. 5A schematically shows a spectral interrogation device with temporal separation by spatial distancing, according to the prior art.

The spectral interrogation device includes an optical source 103, a measurement optical fibre 105, a circulator 123 and a detector 109. When a light signal is emitted by the optical source 103, it is directed to the measurement optical fibre 105 by the optical circulator 123. The measurement optical fibre 105 comprises several Bragg gratings 115 sufficiently spaced apart in order to create a time gap that can be managed by the electronics of the detector 109. The light peaks reflected by the different Bragg gratings are then directed to the detector 109 by the optical circulator 123.

This device is fairly simple and does not require any additional elements in the acquisition chain. However, it is necessary to set a minimum distance between two successive Bragg gratings typically approximately at least 1 m. For example, for a source emitting a light pulse of 30 ns, the time delay must be at least 30 ns to be able to distinguish two consecutive light peaks. Taking into account the return journey of two peaks reflected by two successive Bragg gratings, the distance between these two successive Bragg gratings must correspond to a delay of 15 ns. Given the speed of light in silica, a delay of 15 ns corresponds to an inter-grating distance of 3 m. In addition, a conventional application generally includes about fifteen Bragg gratings, which consequently require a fibre length of at least 45 m. Allowing for a safety margin of 10% to 20%, this gives a fibre length of at least 55 m. This makes small-footprint applications impossible or very complicated, such as in the blades of an aircraft engine or in other equipment or installations with relatively small dimensions.

In order to solve this problem, there is currently a second solution, which proposes temporal separation by means of a spectral delay. This solution involves setting a delay that depends on the wavelength or the spectral range of the light signal. This method requires the addition of a spectral discrimination element and a delay element and can be achieved in two configurations.

Figure 5B:
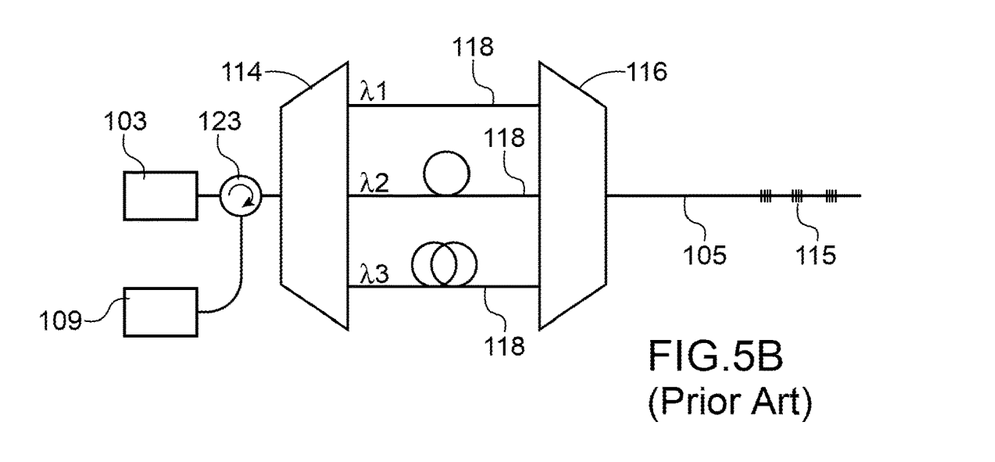
FIG. 5B and FIG. 5C schematically show spectral interrogation devices with temporal separation by parallelized and serial delays respectively, according to the prior art.

FIG. 5B schematically shows a spectral interrogation device with temporal separation by parallelized delays, according to the prior art.

The spectral interrogation device using parallelized delays according to this first configuration includes an optical source 103, two demultiplexing-multiplexing modules 114, 116, a set of optical fibres with parallelized delays 118, a measurement optical fibre 105, an optical circulator 123 and a detector 109.

The light signal emitted by the optical source 103 is broken down into N spectral channels via the first demultiplexing-multiplexing module 114. Each channel is associated with an increasing journey length. The channel 1 will cover a length $L_1$, the channel 2 a length $L_2$ greater than $L_1$, ..., and the channel N a length $L_N$ greater than $L_{N-1}$.

The difference between two successive lengths is chosen so that the electronics of the detector 109 are capable of distinguishing between the signals coming from two different spectral channels.

The N spectral channels are then recombined by the second demultiplexing-multiplexing module 116 before being directed to the measurement optical fibre 105 comprising several Bragg gratings 115. The light peaks reflected by the Bragg gratings travel in the opposite direction before being directed to the detector 109 by the circulator 123.

Figure 5C:
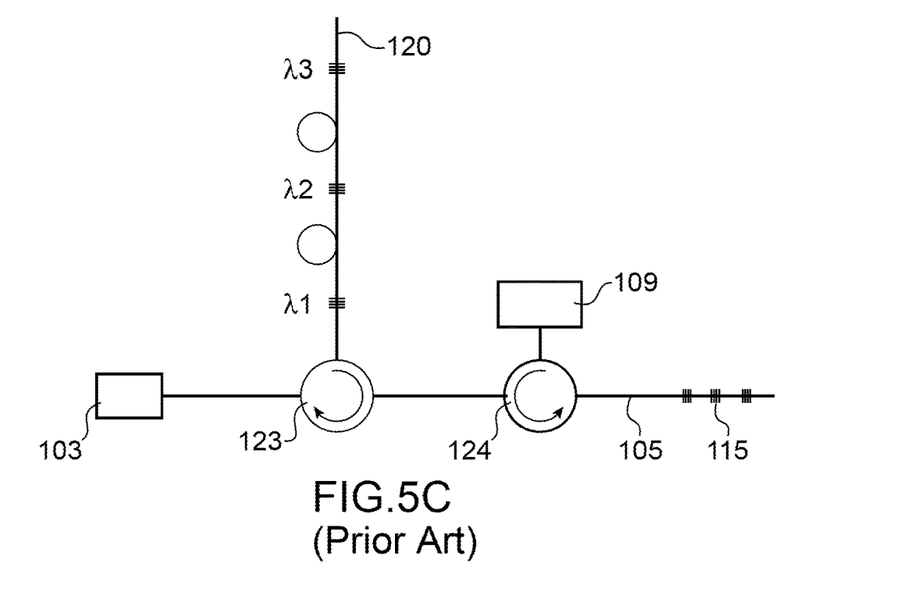

FIG. 5C schematically shows a spectral interrogation device with temporal separation by serial delays, according to the prior art.

The spectral interrogation device using serial delays according to this second configuration includes an optical source 103, two optical circulators 123, 124, a fibre optic line with serial delays 120, a measurement optical fibre 105, and a detector 109.

The fibre optic line with serial delays 120 includes Bragg gratings 115 with different wavelengths. Each Bragg grating is a reflector in a certain spectral band. The distance between two Bragg gratings thus ensures the delay between two spectral channels.

A light signal emitted by the optical source 103 is directed to the fibre optic line with serial delays 120 by the first optical circulator 123. The different channels reflected by the different Bragg gratings are then directed to the measurement optical fibre 105 by the second optical circulator 124 and back to the detector 109.

However, temporal separation by means of a parallelized spectral delay or serial delay requires relatively long optical fibres in order to generate a delay between Bragg grating measurements. Several dozen metres are typically needed. In addition, there is a constraint on the spectral positioning of the gratings, which requires the wavelength of each Bragg grating to coincide precisely with a defined spectral range.

Moreover, the number of Bragg gratings and the delay between Bragg gratings are fixed by design in all spectral interrogation devices in the prior art. It is not possible to adapt the delays set by design as a function of the delays required for various applications. It should be noted that a given application is defined by a certain number of parameters comprising the number of Bragg gratings, the wavelengths of the Bragg gratings and the space between these gratings. So if the application is changed, the whole hardware configuration has to be modified to have parameters adapted to the new application.

The object of the present invention is to overcome the aforementioned drawbacks by proposing a spectral interrogation device that can successively measure Bragg wavelength bands of at least one optical fibre precisely, robustly and flexibly where the parameters can be adapted to the application.

DISCLOSURE OF THE INVENTION

The invention relates to a Bragg wavelength spectral interrogation device, having:
- at least one optical source designed to emit a light signal,
- at least one measurement optical fibre comprising a series of successive Bragg gratings designed to reflect the light signal in different wavelength bands,
- at least one reflective optical fibre comprising a total reflection element,
- at least one wavelength detector, and
- at least one optical switch designed to switch the passage of the light signal between said at least one optical source, said at least one measurement optical fibre, said at least one reflective optical fibre, and said at least one detector according to a sequence of three operating modes comprising a first mode, known as start-up mode, in which the light signal emitted by a given optical source is guided from said optical source to a corresponding measurement optical fibre, a second mode, known as measurement mode, in which said light signal is guided to make a predetermined number of return trips in a line formed by a coupling between said measurement optical fibre and a corresponding reflective optical fibre, thus generating a predetermined delay between the successive Bragg gratings, and a third mode, known as detection mode, in which said light signal is guided to a corresponding detector which is designed to successively measure the wavelength bands associated with the Bragg gratings comprised in said measurement fibre.

This device can successively measure Bragg wavelength bands of at least one optical fibre precisely, robustly and flexibly. It can greatly decrease the constraint on the distance between two successive Bragg gratings. The choice of the wavelength bands of the Bragg gratings is arbitrary; they do not have to be at the centre of a given range. In addition, it requires very little fibre optic length, as the measurement optical fibre itself acts as a retarder.

Advantageously, the device includes at least one parameterizable driver designed to control the switching of the optical switch during start-up, measurement and detection modes according to predetermined parameters.

In this way, the device is dynamic such that it can be easily adapted to various types of applications.

Advantageously, said at least one parameterizable driver is designed to control the predetermined number of return trips of the light signal during the measurement mode as a function of the distance between the Bragg gratings and the measurement rate of the detector.

In this way, by adapting the number of return trips according to the desired delay between the successive Bragg gratings, the device can have a minimum distance between two consecutive Bragg gratings and can therefore be installed in smaller equipment.

Advantageously, said at least one optical source is a source of light signals with a wide spectral band whose width is between approximately 10 nm and approximately 150 nm, the period of a light pulse being between approximately 10 ns and approximately 100 ns.

Advantageously, said at least one optical source is a wide-spectrum source (e.g.: SLED or ASE) designed to emit, at each emission time, a light signal comprising all the wavelengths of the spectral band.

Advantageously, the device includes additional lengths of optical fibres designed to take account of the propagation time of the light signal as well as the switching time of the optical switch.

This allows a margin of uncertainty to be left so as not to be accurate to the nanosecond and to ensure that the train is not cut off in the middle.

According to a first embodiment, the device includes at least one circulator designed to couple said measurement optical fibre to said corresponding source during the start-up mode and to couple said measurement optical fibre to said corresponding detector during the detection mode.

Advantageously, said at least one optical switch is designed to switch the passage of the light signal in two switching operations, including a first switching operation in which said measurement optical fibre is connected to said corresponding source via the corresponding circulator in accordance with the start-up mode, a second switching operation in which said measurement optical fibre is connected to said corresponding reflective optical fibre in accordance with the measurement mode, and a return to the first switching operation, in which said measurement optical fibre is connected to said corresponding detector via said circulator in accordance with the detection mode.

Advantageously, the device includes:
- a set of N first optical fibre channels, each of which includes a source, a circulator, and a detector,
- a set of N second optical fibre channels, each of which corresponds to a reflective optical fibre,
- a set of M third optical fibre channels, each of which corresponds to a measurement optical fibre, and
- said at least one optical switch is a multiple optical switch designed to connect together the different first channels, second channels and third channels according to said start-up, measurement and detection modes and associating said set of N first channels with said set of N second channels to interrogate the Bragg gratings comprised in said set of M third channels.

According to a second embodiment, said at least one optical switch is designed to switch the passage of the light signal according to three connections, including a first connection in which said measurement optical fibre is connected to said corresponding source in accordance with the start-up mode, a second connection in which said measurement optical fibre is connected to a corresponding reflective optical fibre in accordance with the measurement mode, and a third connection, in which said reflective optical fibre is connected to said corresponding detector in accordance with the detection mode.

Advantageously, the device includes:
- a set of N first optical fibre channels, each of which includes a source,
- a set of N second optical fibre channels, each of which corresponds to a reflective optical fibre,
- a set of M third optical fibre channels, each of which corresponds to a measurement optical fibre, and
- a set of N fourth optical fibre channels, each of which has a detector, and
- said at least one optical switch is a multiple switch designed to connect together the different first channels, second channels, third channels and fourth channels according to said start-up, measurement and detection modes and associating said set of N first channels with said set of N second channels and said set of N fourth channels to interrogate the Bragg gratings comprised in said set of M third channels.

The invention also relates to a sensor including a device according to any one of the preceding features, said sensor being designed to measure a physical parameter from variations in Bragg wavelength bands.

Other advantages and features of the invention will become apparent in the non-limited detailed description below.

BRIEF DESCRIPTION OF THE FIGURES

We will now describe, by way of non-limiting examples, embodiments of the invention with reference to the appended drawings, in which:

FIG. 2A, FIG. 2B, FIG. 2C-1 and FIG. 2C-2 schematically show variants of a spectral interrogation device, according to a first preferred embodiment of the invention;

DESCRIPTION OF THE EMBODIMENTS

The concept of the invention is to achieve temporal separation by bouncing the optical signal to increase the delay between the Bragg gratings. More specifically, the invention proposes coupling the measurement Bragg gratings with a fixed reflector and making as many return trips as necessary to artificially increase the distance between the gratings. This increases the temporal delay and thus enables the detector to distinguish between the signals coming from different Bragg gratings.

Figure 1:
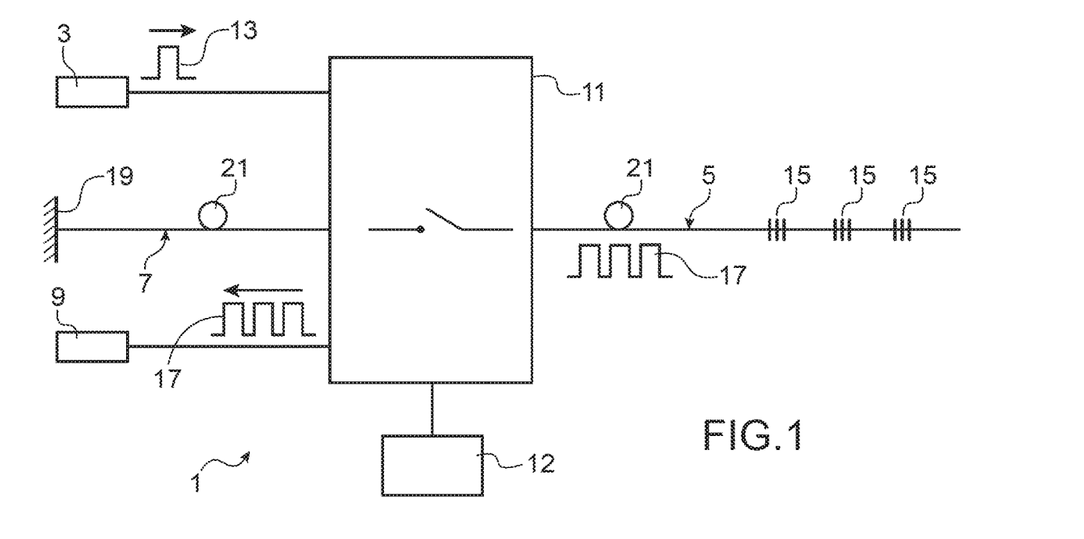
FIG. 1 schematically shows a Bragg wavelength spectral interrogation device, according to one embodiment of the invention.

FIG. 1 schematically shows a Bragg wavelength spectral interrogation device, according to one embodiment of the invention.

The spectral interrogation device 1 includes at least one optical source 3, at least one measurement optical fibre 5, at least one reflective optical fibre 7, at least one detector 9, at least one optical switch 11, and at least one parameterizable driver 12.

Each optical source 3 (FIG. 1 only shows one) is designed to emit a light signal (for example, a light pulse) 13 with a wide spectral band. Advantageously, the spectral width of a light signal 13 is between approximately 10 nm and approximately 150 nm. The period of a light signal 13 can be between approximately 10 ns and approximately 100 ns.

By way of example, the optical source 3 is a SLED (superluminescent diode) or ASE (amplified spontaneous emission source) designed to emit, at each emission time, a light signal 13 comprising all the wavelengths of the spectral band.

Each measurement optical fibre 5 (FIG. 1 only shows one) comprises a series of successive Bragg gratings (FBG) 15 designed to reflect the light signal 13 in different wavelength bands 17 or peaks.

It should be noted that a Bragg grating 15 is a local modulation of the refractive index forming a wavelength-selective reflector. Each Bragg grating 15 corresponds to a wavelength or rather to a wavelength range or band 17. A Bragg grating 15 is thus a kind of bandpass filter that passes all the wavelength bands 17 of the light signal 13 apart from one band (or peak) that is reflected. The different wavelength bands 17 are multiplexed in the measurement optical fibre 5.

Furthermore, each reflective optical fibre 7 (FIG. 1 only shows one) comprises a total reflection element 19. For example, a totally reflective mirror 19 (i.e. >99%) is installed on one end of the reflective optical fibre 7.

Each detector 9 (FIG. 1 only shows one) is designed to measure the wavelength bands 17 associated with the different Bragg gratings 15. By way of example, the detector 9 can be an optical spectrum analyser (OSA) or a wavemeter or a photo detector (photo transistor, photodiode, avalanche photodiode) that can measure the different Bragg peaks.

The at least one optical switch 11 (FIG. 1 only shows one) is controlled electronically by the parameterizable driver 12 and is advantageously very quick with a switching time of less than approximately 100 ns and the insertion losses of which are quite low at approximately 1 dB or less.

The optical switch 11 is designed to switch the passage of the light signal 13 between the optical source(s) 3, the measurement optical fibre(s) 5, the reflective optical fibre(s) 7, and the detector(s) 9 according to a sequence of three consecutive operating modes. These operating modes include first, second and third modes, known as start-up, measurement, and detection modes, respectively. It should be noted that the switching of the optical switch 11 is controlled by the parameterizable driver 12 during these start-up, measurement and detection modes according to predetermined parameters.

During the start-up mode, the light signal 13 emitted by a given optical source 3 is guided from this optical source 3 to a corresponding measurement optical fibre 5.

Then, during the measurement mode, the light signal 13 is confined in a line formed by a coupling between the measurement optical fibre 5 and a corresponding reflective optical fibre 7 to make a predetermined number of return trips. The propagation of the light signal 13 in this to-and-fro movement for a predetermined time between the series of Bragg gratings 15 of the measurement optical fibre 5 and the totally reflective element 19 at the end of the reflective optical fibre 7 generates a predetermined delay between the successive Bragg gratings 15.

More specifically, the parameterizable driver 12 is designed to control the predetermined number of return trips of the light signal 13 (or the predetermined time) during the measurement mode as a function of the distance between the Bragg gratings 15 and the measurement rate of the detector 9.

For example, for an interrogation device 1 including an optical source 3 emitting a light source 13, the period of which is 10 ns, and a measurement optical fibre 5, the distance of which between two successive Bragg gratings is 15 cm, which corresponds to a time lag of 1.5 ns, the predetermined number is set for at least seven return trips. Indeed, to ensure that the wavelength bands corresponding to two successive Bragg gratings do not overlap, the time lag has to be greater than 10 ns, i.e. greater than around 7 times 1.5 ns. In this way, when the light pulse 13 makes at least seven return trips between each two successive Bragg gratings, the detector 9 can easily distinguish between the signals of the different Bragg gratings.

The interrogation device 1 advantageously includes additional lengths 21 of optical fibres so as not to be accurate to the nanosecond. These additional lengths 21 are designed to take account of the propagation time of the light signal 13 as well as the switching time of the optical switch 11.

Finally, during the detection mode, the wavelength bands 17 of the light signal 13 are guided to a corresponding detector 9. This detector 9 is designed to successively measures these wavelength bands 17 associated with the Bragg gratings 15 contained in the measurement optical fibre 5.

In this way, the interrogation device 1 according to the invention expands the distance between two successive Bragg gratings 15 in a functional and modular way by cleverly creating a to-and-fro movement between the Bragg gratings 15 themselves.

It should be noted that a typical power loss for a fast optical switch is around 0.6 dB, which represents 1.2 dB for a return trip. If a power loss limit is fixed at around 10 dB to 15 dB, this corresponds to a total of around 10 return trips. This limit of 10 dB to 15 dB is only provided as a rough guide; it can be increased if a very sensitive APD detector is used and/or if a source with greater power is used.

For example, considering the application described with reference to FIG. 5A of the prior art using an optical source emitting a light pulse of 30 ns. In order to create a delay of 15 ns corresponding to a total delay of 3 m between two successive Bragg gratings and making 10 return trips, the minimum distance between these two successive Bragg gratings need only be 0.3 m. Allowing for a safety margin of 10% to 20%, this gives an inter-grating distance of around 35 cm. It is possible to reduce the distance between the Bragg gratings even more by increasing the number of return trips.

It should be noted that despite the fact that FIG. 1 only shows one optical switch, it is of course conceivable for the interrogation device to comprise several independent optical switches working in parallel. In a first approach, the optical switches can share the same parameterizable driver with a common switching sequence. In a second approach, each of the switches has its own parameterizable driver and thus its own switching sequence. The maximum number of switches depends solely on the size of the interrogation device.

By way of non-limiting examples only and for the sake of clarity, the following description considers only interrogation devices each having a single or multiple optical switch and a single driver.

Figure 2A:
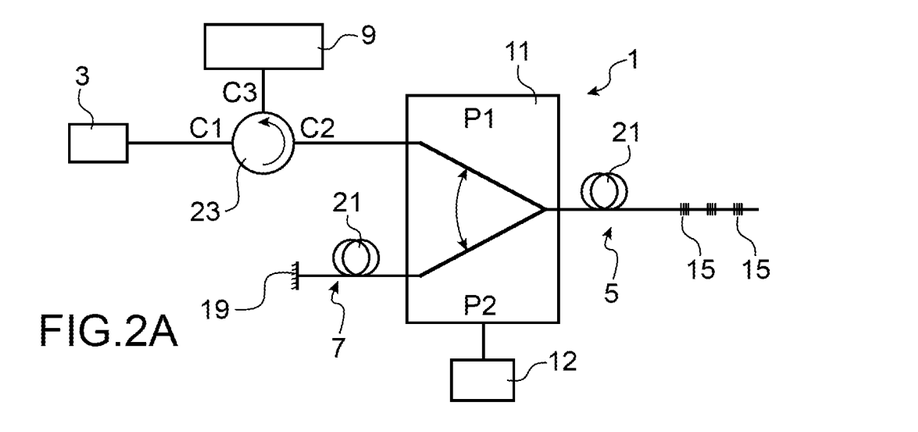
Figure 2B:
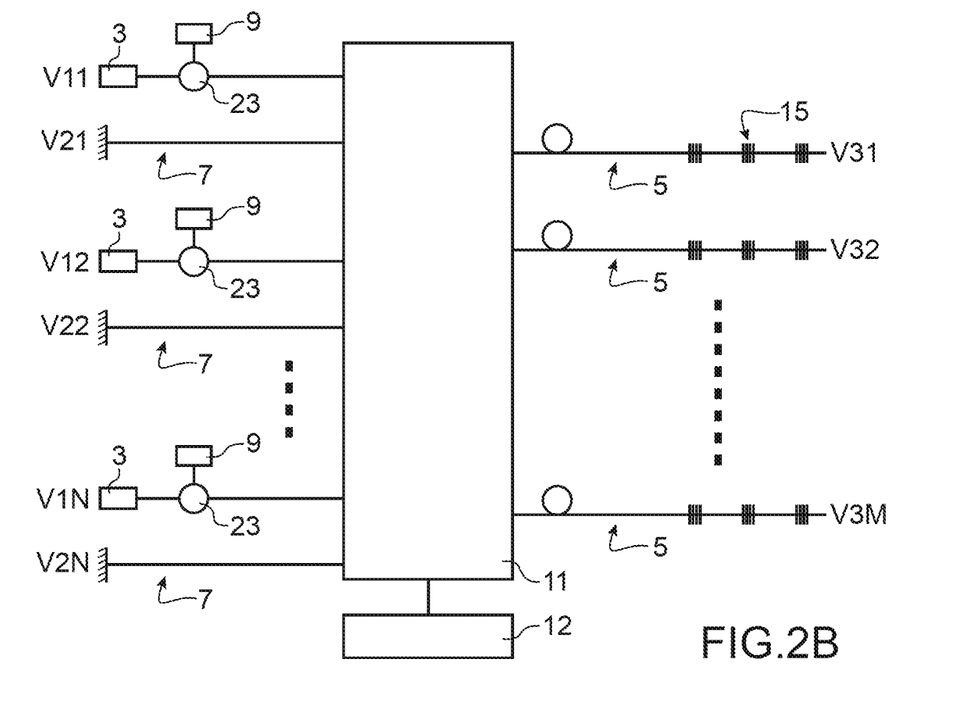

FIGS. 2A-2C schematically show variants of a spectral interrogation device, according to a first preferred embodiment of the invention.

According to this first embodiment, the spectral interrogation device 1 includes at least one optical circulator 23 designed to couple each measurement optical fibre 5 to a corresponding optical source 3 during the start-up mode and to then couple the measurement optical fibre 5 to the corresponding detector 9 during the detection mode.

The optical switch 11 is designed to switch the passage of the light signal 13 in two switching operations. During the first switching operation, the measurement optical fibre 5 is connected to the corresponding optical source 3 via the corresponding circulator 23 in accordance with the start-up mode. During the second switching operation, the measurement optical fibre 5 is connected to the corresponding reflective optical fibre 7 in accordance with the measurement mode. The optical switch 11 then makes a return to the first switching operation, in which the measurement optical fibre 5 is connected to the corresponding detector 9 via the circulator 23 in accordance with the detection mode.

More specifically, FIG. 2A shows a block diagram of a spectral interrogation device 1 including a single optical source 3, a measurement optical fibre 5, a reflective optical fibre 7, a detector 9, an optical circulator 23, an optical switch 11, and a parameterizable driver 12.

During the first switching operation, the optical switch 11 is in the position P1 by default. In this way, when a wideband light signal 13 is emitted by the optical source 3, this light signal goes from the port C1 to the port C2 of the optical circulator 23 and passes via the optical switch 11 to the measurement fibre 5 comprising the series of Bragg gratings 15.

During the second switching operation, the optical switch 11 moves to position P2. The light signal is then reflected on the Bragg gratings 15 and returns to the reflective fibre 7 comprising the totally reflective element 19. The light signal makes return trips in the cavity formed by the coupling between the measurement optical fibres 5 and reflective optical fibres 7. Every return trip, the temporal delay between two successive Bragg gratings 15 increases. The required number of return trips depends on the distance between the Bragg gratings 15 as well as the measurement rate of the detector 9.

When the minimum number of return trips has been reached, the optical switch 11 returns to the first switching position by switching back to position P1. The light signal is then directed to the port C3 of the optical circulator 23 to be detected by the detector 9.

FIG. 2B shows a block diagram of a spectral interrogation device 1 including N optical sources 3, N reflective optical fibres 7, N detectors 9, N circulators 23, M measurement optical fibres 5, an optical switch 11, and a parameterizable driver 12.

According to this example, the interrogation device 1 includes a set of N first optical fibre channels V11-V1N, a set of N second optical fibre channels V21-V2N, a set of M third optical fibre channels V31-3M and a multiple optical switch 11 controlled by the parameterizable driver 12. N is an integer greater than or equal to 1 and M is an integer greater than or equal to N. It should be noted that the multiple optical switch 11 can be replaced by a plurality of independent switches controlled by a common driver or by a plurality of multiple drivers. It is also possible, of course, to have several multiple switches.

Each channel in the set of N first optical fibre channels V11-V1N includes an optical source 3, an optical circulator 23, and a detector 9. The set of N second optical fibre channels V21-V2N correspond to N reflective optical fibres 7. The set of M third optical fibre channels V31-V3M correspond to M measurement optical fibres 5.

By way of example, the optical switch 11 is a multiple switch with 2N×M arms, 2N arms of which are included in a first side of the switch and the other M arms are included in a second side of the multiple switch 11. This multiple optical switch 11 is designed to connect together the different first channels V11-V1N, second channels V21-V2N and third channels V31-V3M according to the three start-up, measurement and detection modes. More specifically, the multiple switch associates the set of N first channels V11-V1N with the set of N second channels V21-V2N to interrogate the Bragg gratings 15 comprised in the set of M third channels. Each first channel is associated with a second corresponding channel in order to interrogate a sub-set of the set of M third channels V31-V3M such that the entire set of M third channels V31-V3M ends up being interrogated. This enables M consecutive series of the three operating modes to be performed, of which each series includes a start-up mode, a measurement mode and a detection mode.

Of course, other configurations or hybrid combinations can be implemented according to this first embodiment depending on the number of arms of the first and second sides of the optical switch 11 used.

FIG. 2C-1 and 2C-2 are an example showing the stages of operation of a spectral interrogation device 1 where N=1 and M=2.

Figure 2C:
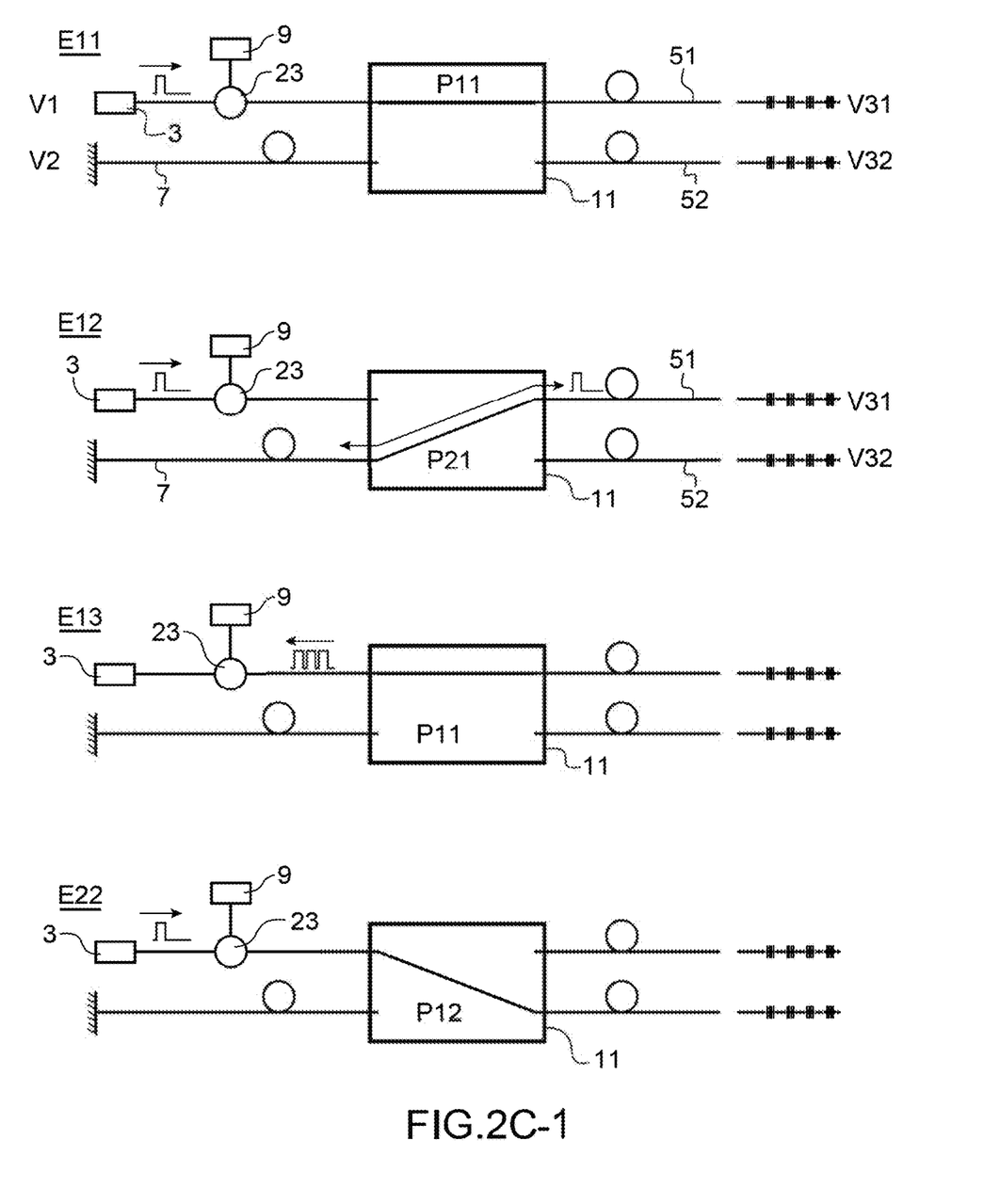
Figure 2C:
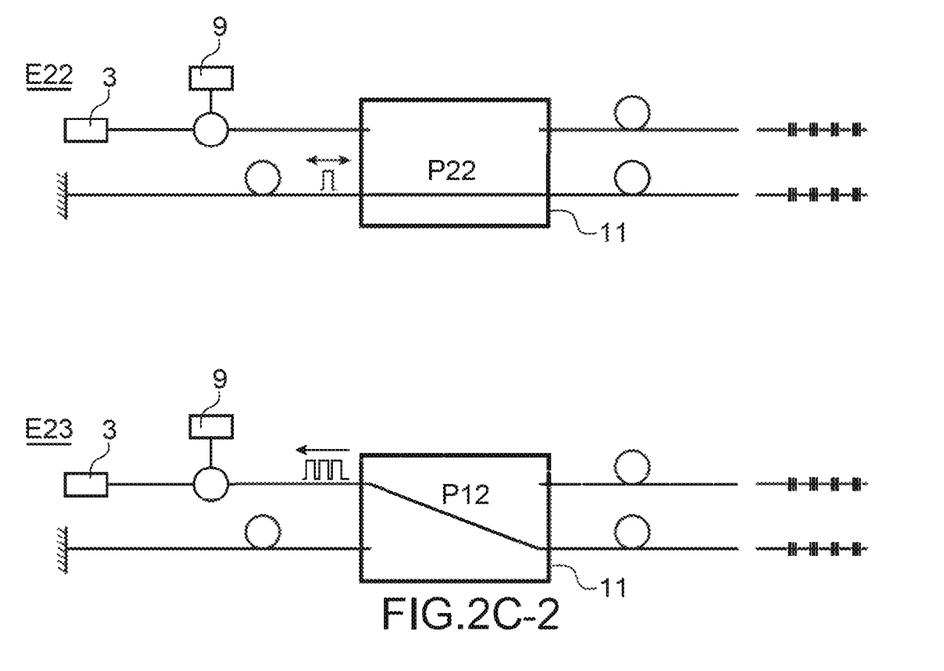

Thus, according to this example, the spectral interrogation device 1 includes a first channel V1 comprising an optical source 3, an optical circulator 23, and a detector 9; a second channel V2 corresponding to a reflective optical fibre 7; a 2×2 multiple optical switch 11; and two third channels V31, V32 corresponding to first 51 and second 52 measurement optical fibres comprising first and second series of Bragg gratings 15 respectively. The 2×2 optical switch is designed to connect the first V1 and second V2 channels of the first side of the optical switch 11 to the third channels V31, V32 of the second side. It should be noted that when the optical switch 11 is said to be in position Pij, this means that the ith channel on the first side of the optical switch 11 is connected to the jth channel on the second side of the optical switch 11, where in this example i=1 or 2, and j=1 or 2.

Operation takes place in two periods according to two consecutive series of the three start-up, measurement and detection operating modes. In the first period (corresponding to a first series of the three operating modes), the first measurement optical fibre 51 comprising the first series of Bragg gratings is interrogated according to the following steps E11-E13:

In step E11 (corresponding to a first start-up mode), the optical switch 11 is in position P11 to guide the light signal onto the first measurement optical fibre 51 comprising the first series of Bragg gratings.

In step E12 (corresponding to a first measurement mode), the optical switch 11 is switched to position P21 so that the light signal makes return trips between the mirror 19 comprised in the reflective optical fibre 7 and the first series of Bragg gratings comprised in the first measurement optical fibre 51.

In step E13 (corresponding to a first detection mode), the optical switch 11 is reset to position P11 so that the light signal goes to the detector 9 via the circulator 23.

In a second instance (steps E21-E23), the second measurement optical fibre 51 comprising the second series of Bragg gratings is interrogated according to the following steps E21-E23:

In step E21 (corresponding to a second start-up mode), the optical switch 11 is in position P12 to guide the light signal onto the second measurement optical fibre 52 comprising the second series of Bragg gratings.

In step E22 (corresponding to a second measurement mode), the optical switch 11 is switched to position P22 so that the light signal makes return trips between the mirror 19 comprised in the reflective optical fibre 7 and the second series of Bragg gratings comprised in the second measurement optical fibre 52.

In step E23 (corresponding to a second detection mode), the optical switch 11 is reset to position P12 so that the light signal goes to the detector via the circulator.

This operating mode therefore enables two fibre Bragg gratings to be interrogated with a 2×2 switch. In general, there can be any number N greater than or equal to 1 of optical sources 3 and reflective optical fibres 7, as well as any number M of measurement optical fibres 5 where M>N, with a 2N×M multiple optical switch as shown in FIG. 2A.

Figure 3A:
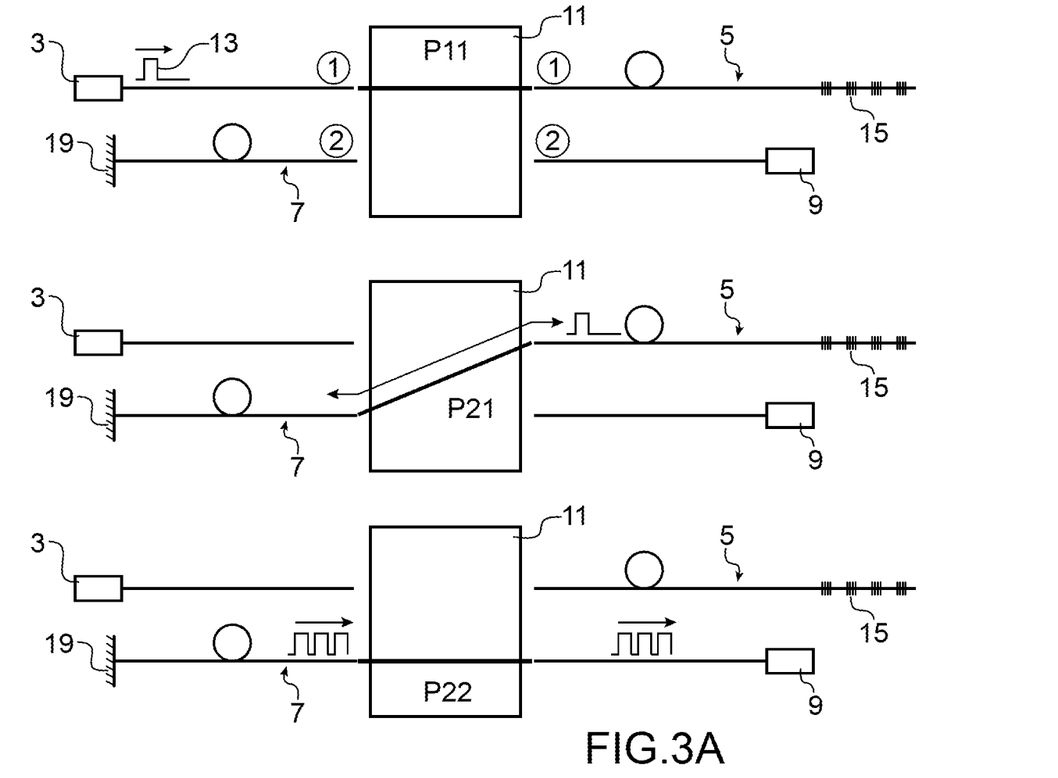
FIG. 3A and FIG. 3B schematically show variants of a spectral interrogation device, according to a second preferred embodiment of the invention.
Figure 3B:
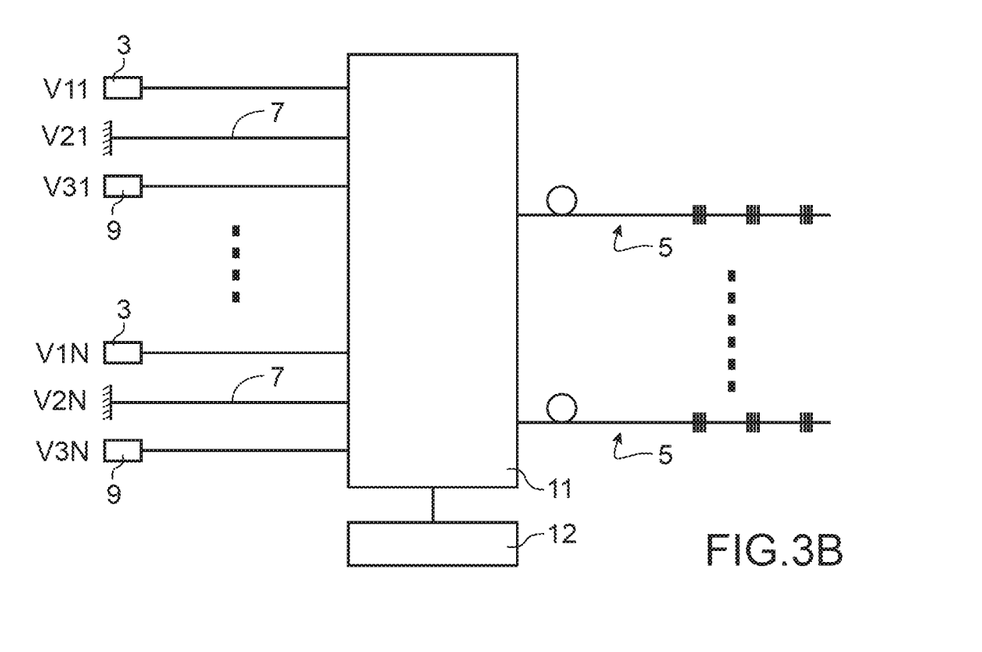

FIGS. 3A and 3B schematically show variants of a spectral interrogation device, according to a second preferred embodiment of the invention.

According to this second embodiment, the spectral interrogation device 1 does not include a circulator. Indeed, one of the arms of the optical switch 11 is used as a detection arm, thus eliminating the need to use a circulator.

In this case, the optical switch 11 is designed to switch the passage of the light signal according to three connections. During the first connection, the measurement optical fibre 5 is connected to the corresponding optical source 3 in accordance with the start-up mode. During the second connection, the measurement optical fibre 5 is connected to a corresponding reflective optical fibre 7 in accordance with the measurement mode. During the third connection, the reflective optical fibre 7 is connected to the corresponding detector 9 in accordance with the detection mode.

More specifically, FIG. 3A shows a block diagram of a spectral interrogation device 1 including a single optical source 3, a measurement optical fibre 5, a reflective optical fibre 7, a detector 9, and a 2×2 multiple optical switch 11 controlled by a parameterizable driver 12.

According to this example, the first and second arms of a first side of the switch can be connected to the optical source 3 and to the reflective optical fibre 7 respectively. The first and second arms of a second side of the switch can be connected to the measurement optical fibre 5 and to the detector 9 respectively. In this way, using an arm of the optical switch 11 as a detection arm simplifies the installation and reduces the number of components.

During the first connection, the optical switch 11 is in the position P11 by default. In this way, when a wideband light signal 13 is emitted by the optical source 3, this light signal passes via the optical switch 11 to the measurement fibre 5 comprising the series of Bragg gratings 15.

During the second connection, the optical switch 11 moves to position P21. The light signal 13 is then reflected on the Bragg gratings 15 and returns to the reflective fibre 7 comprising the totally reflective element 19. The light signal makes return trips in the coupling line between the measurement optical fibres 5 and reflective optical fibres 7. Once the minimum number of return trips has been reached, the device 1 switches to the third connection configuration.

During this third connection, the optical switch 11 moves to position P22 such that the bands 17 of different wavelengths of the light signal are directed to the detector 9.

FIG. 3B shows a block diagram of a spectral interrogation device including N optical sources 3, N reflective optical fibres 7, N detectors 9, M measurement optical fibres 5, an optical switch 11, and a parameterizable driver 12.

More specifically, this device includes a set of N first optical fibre channels V11-V1N, a set of N second optical fibre channels V21-V2N, a set of M third optical fibre channels V31-V3M, a set of N fourth optical fibre channels V41-V4N, and a multiple optical switch 11 controlled by a parameterizable driver 12. As above, N is an integer greater than or equal to 1 and M is an integer greater than or equal to N.

Each of the channels in the set of N first optical fibre channels V11-V1N includes an optical source 3. The set of N second optical fibre channels V21-V2N correspond to N reflective optical fibres 7. The set of M third optical fibre channels V31-V3M correspond to M measurement optical fibres 5. The set of N fourth optical fibre channels V41-V4N includes N detectors 9 respectively.

By way of example, the set of N first optical fibre channels V11-V1N and the set of N second optical fibre channels V21-V2N can be connected to a first side of the optical switch 11. The set of M third optical fibre channels V31-V3M can be connected to a second side of the optical switch 11. The set of N fourth optical fibre channels V41-V4N can be connected to the first or to the second side of the optical switch 11. Alternatively, part of the set of N fourth optical fibre channels V41-V4N can be connected to the first side of the optical switch 11 and the other part to the second side of the optical switch. Of course, other configurations or combinations are possible depending on the number of arms of the first and second sides of the optical switch used.

The multiple optical switch 11 (or several switches) is designed to connect together the different first channels, second channels, third channels and fourth channels according to the three start-up, measurement and detection operating modes and associating the set of N first channels with the set of N second channels and the set of N fourth channels to interrogate the Bragg gratings comprised in the set of M third channels.

Figure 4:
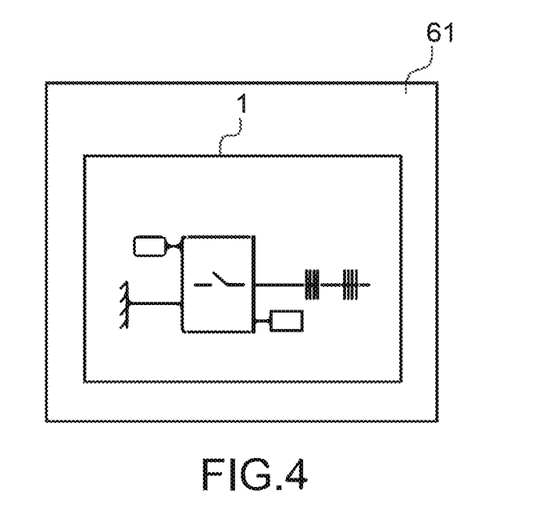
FIG. 4 schematically shows a sensor for measuring a physical parameter using Bragg gratings, according to one embodiment of the invention.

FIG. 4 schematically shows a sensor for measuring a physical parameter using Bragg gratings, according to one embodiment of the invention.

The sensor 61 includes a spectral interrogation device 1 according to the embodiments described above. This sensor 61 is designed to measure a physical parameter (for example, temperature, deformation, movement, etc.) from variations in Bragg wavelength bands 15.

Indeed, a variation in the physical parameter causes a modulation of the Bragg grating and therefore a variation in the positions of the wavelength bands relative to a reference position. The amplitude of this variation represents the physical parameter to be measured.

In this way, the invention has several advantages over the prior art. A first advantage concerns the fact that the spectral position of the Bragg gratings is completely free or arbitrary. It is not necessary to fix the wavelengths in specific ranges, a constraint found in time-domain multiplexing methods based on spectral delay according to the prior art.

A second advantage is the fact that the required fibre optic length is smaller given that the measurement optical fibre is used as an element enabling the delay to be generated between the Bragg gratings. It should be noted that in time-domain multiplexing methods based on spectral delay, several dozen metres of optical fibre are required. This great length makes integration and installation difficult.

A third advantage is the fact that the minimum distance possible between two consecutive Bragg gratings can be low by adapting the number of return trips. The only limitation is that each return trip reduces the optical power. Thus, in order to maintain a sufficient optical level, it is possible either to limit the number of return trips to around ten, or to use a more powerful optical source, in which case the number of return trips can be increased.

A fourth advantage is the fact that the device according to the invention is dynamic. It is very simple to adapt the number of return trips of the light pulse. This is not possible in the prior art given that the delay is fixed by the length of fibre, which is fixed.

Of course, various modifications may be made by a person skilled in the art to the invention as described, by way of non-limiting examples only.

What is claimed is:

1. Bragg wavelength spectral interrogation device, having:
   at least one optical source designed to emit a light signal,
   at least one measurement optical fibre comprising a series of successive Bragg gratings designed to reflect the light signal in different wavelength bands,
   at least one reflective optical fibre comprising a total reflection element,
   at least one wavelength detector, and
   at least one optical switch designed to switch the passage of the light signal between said at least one optical source, said at least one measurement optical fibre, said at least one reflective optical fibre, and said at least one detector according to a sequence of three operating modes comprising a first mode, known as start-up mode, in which the light signal emitted by a given optical source is guided from said optical source to a corresponding measurement optical fibre, a second mode, known as measurement mode, in which said light signal is guided to make a predetermined number of return trips in a line formed by a coupling between said measurement optical fibre and a corresponding reflective optical fibre, thus generating a predetermined delay between the successive Bragg gratings, and a third mode, known as detection mode, in which said light signal is guided to a corresponding detector which is designed to successively measure the wavelength bands associated with the Bragg gratings comprised in said measurement fibre.

2. Device according to claim 1, including at least one parameterizable driver designed to control the switching of the optical switch during start-up, measurement and detection modes according to predetermined parameters.

3. Device according to claim 2, wherein at least one parameterizable driver is designed to control the predetermined number of return trips of the light signal during the measurement mode as a function of the distance between the Bragg gratings and the measurement rate of the detector.

4. Device according to claim 1, wherein at least one optical source is a source of light signals with a wide spectral band whose width is between approximately 10 nm and approximately 150 nm, the period of a light pulse being between approximately 10 ns and approximately 100 ns.

5. Device according to claim 4, wherein at least one optical source is a broadband source designed to emit, at each emission time, a light signal comprising all the wavelengths of the spectral band.

6. Device according to claim 1, including additional lengths of optical fibres designed to take account of the propagation time of the light signal as well as the switching time of the optical switch.

7. Device according to claim 1, including at least one circulator designed to couple said measurement optical fibre to said corresponding source during the start-up mode and to couple said measurement optical fibre to said corresponding detector during the detection mode.

8. Device according to claim 7, wherein at least one optical switch is configured to switch the passage of the light signal in two switching operations, including a first switching operation in which said measurement optical fibre is connected to said corresponding source via the corresponding circulator in accordance with the start-up mode, a second switching operation in which said measurement optical fibre is connected to said corresponding reflective optical fibre in accordance with the measurement mode, and a return to the first switching operation, in which said measurement optical fibre is connected to said corresponding detector via said circulator in accordance with the detection mode.

9. Device according to claim 7, werein it includes:
a set of N first optical fibre channels, each of which includes a source, a circulator, and a detector,
a set of N second optical fibre channels, each of which corresponds to a reflective optical fibre,
a set of M third optical fibre channels, each of which corresponds to a measurement optical fibre, and in that
said at least one optical switch is a multiple optical switch designed to connect together the different first channels, second channels and third channels according to said start-up, measurement and detection modes and associating said set of N first channels with said set of N second channels to interrogate the Bragg gratings comprised in said set of M third channels.

10. Device according to claim 1, wherein at least one optical switch is designed to switch the passage of the light signal according to three connections, including a first connection in which said measurement optical fibre is connected to said corresponding source in accordance with the start-up mode, a second connection in which said measurement optical fibre is connected to a corresponding reflective optical fibre in accordance with the measurement mode, and a third connection, in which said reflective optical fibre is connected to said corresponding detector in accordance with the detection mode.

11. Device according to claim 10, including:
a set of N first optical fibre channels, each of which includes a source,
a set of N second optical fibre channels, each of which corresponds to a reflective optical fibre,
a set of M third optical fibre channels, each of which corresponds to a measurement optical fibre, and
a set of N fourth optical fibre channels, each of which includes a detector, and in that said at least one optical switch is a multiple switch designed to connect together the different first channels, second channels, third channels and fourth channels according to said start-up, measurement and detection modes and associating said set of N first channels with said set of N second channels and said set of N fourth channels to interrogate the Bragg gratings comprised in said set of M third channels.

12. Sensor including a device according to claim 1, said sensor being designed to measure a physical parameter from variations in Bragg wavelength bands.

* * * * *